Figure 1:
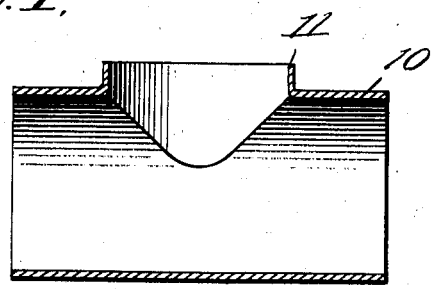

W. R. WILLETTS.
PIPE COUPLING.
APPLICATION FILED MAY 15, 1909.

954,068.

Patented Apr. 5, 1910.
2 SHEETS—SHEET 1.

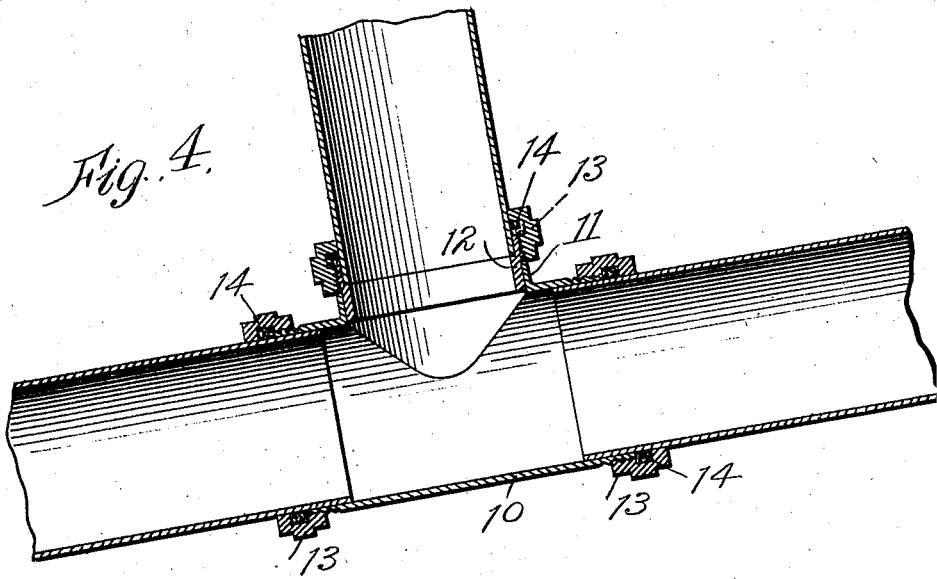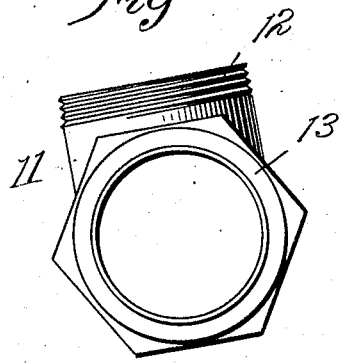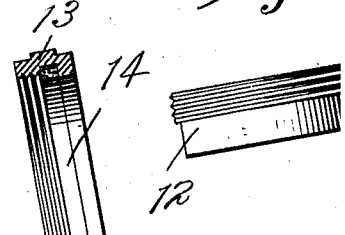

UNITED STATES PATENT OFFICE.

WILLIAM R. WILLETTS, OF WATERBURY, CONNECTICUT, ASSIGNOR TO AMERICAN PIN COMPANY, OF WATERBURY, CONNECTICUT, A CORPORATION OF CONNECTICUT.

PIPE-COUPLING.

954,068.

Specification of Letters Patent.

Patented Apr. 5, 1910.

Application filed May 15, 1909. Serial No. 496,189.

To all whom it may concern:

Be it known that I, WILLIAM R. WILLETTS, a citizen of the United States, and a resident of Waterbury, in the county of New Haven and State of Connecticut, have invented certain new and useful Improvements in Pipe-Couplings, of which the following is a specification.

My invention relates to couplings or joints for pipes, and comprises more particularly certain improvements in such couplings or joints made from sheet metal by a mechanical working.

Pipe couplings of the general nature to which my invention relates are more particularly intended for low-pressure service, as in waste pipes and overflows. It has been proposed to make such couplings from an initial sheet metal tube, and various apparatus and methods of construction have been employed to produce them. There are, however, certain inherent difficulties to the working of sheet metal into the required form, and by reason of these difficulties the finished product has usually had certain disadvantageous features. In the first place, the usual practice is to start with a sheet metal tube and stamp, draw, or otherwise work from this a branched tubular structure. For example, in the manufacture of T joints or couplings, the initial sheet metal tube must have a branch worked from the side wall. Such a treatment necessarily has a tendency to produce undue thinness in that portion of the wall of the initial tube which is to supply the material for the branch. Another consideration is that if the branch is made long enough to conveniently take a serviceable thread the thinning of the adjacent portion of the initial tube is especially great, and at the same time the wall of the branch is too thin for practical purposes. On the other hand, if the branch is made short enough to retain sufficient thickness in the parts there is usually insufficient length for secure threading. To overcome these difficulties it has been proposed to crowd the metal from the ends of the initial tube in the direction of that portion from which the branch is to be wrought. There are still, however, disadvantages in such a treatment. The crowding of the metal in that way must have a bad effect upon the portion of the wall of the initial tube which is opposite to that part supplying the material for the branch.

The principal object of my invention is to avoid the difficulty which presents itself in respect to the added branch.

Other objects and features of my invention will be apparent from the description of an embodiment of the same, shown in the accompanying drawings.

Figure 2:
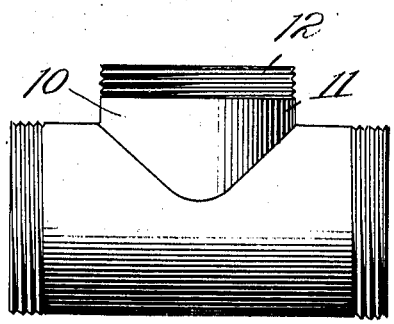
Figure 3:
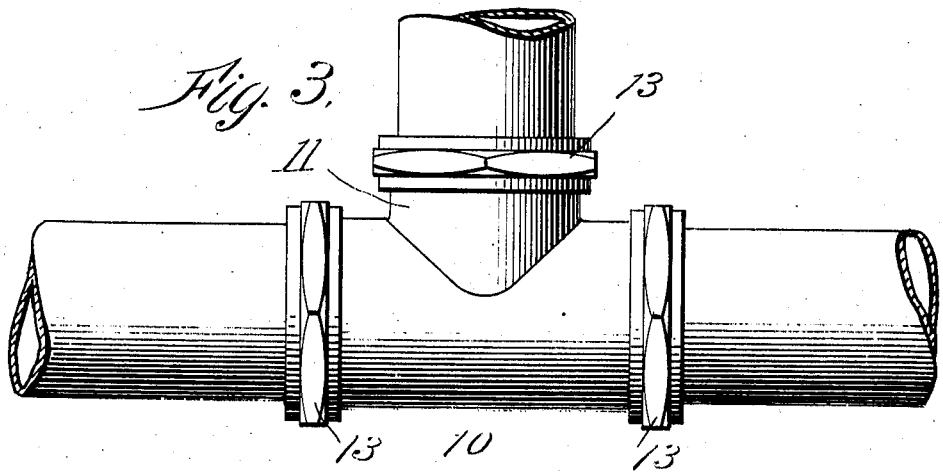

In said drawings Figure 1 is a longitudinal vertical section through the initial tube after the branch has been worked out from its wall. Fig. 2 is an elevation of the same, with the strengthening or threading sleeve inserted in the branch, and with the threads formed on the ends of the tube. Fig. 3 is an elevation of the coupling as connected with the pipes to be joined. Fig. 4 is a longitudinal vertical section of the same. Fig. 5 is an end view of the same, with the pipe connected to the added branch removed. Fig. 6 is a longitudinal vertical section of the tightening collar employed in joining pipes by the coupling, and Fig. 7 is an elevation of the strengthening or threading sleeve inserted in the added branch, as will hereinafter be described.

Referring now more specifically to said drawings, 10 indicates the initial tube of sheet metal which is assumed to have been perforated and struck out to form the branch 11. The particular method of effecting this operation is not a part of my present invention, but this may be done in any suitable way. This added branch 11 is not formed of sufficient length to conveniently receive the threading, but, at the same time, it is thinner than the wall of the initial tube from which it was produced. In order to lengthen this branch 11, and, at the same time strengthen it, I employ a strengthening or threading sleeve 12, which is shown in detail in Fig. 7. This strengthening or threading sleeve is inserted in the added branch 11 and suitably secured, as by brazing, welding or any other treatment suitable for this purpose. The sleeve thus inserted has a lower portion whose outside diameter conforms substantially with the inner diameter of the branch 11, and an upper portion which is of greater diameter, thus forming inner and outer shoulders in the sleeve. The upper portion receives the threading and the outside shoulder formed by it may fit snugly against the end of the branch for the sake of neatness and rigidity, while at the same time serving to arrest the sleeve at the proper position in the course of manufacture. The inner shoulder of the sleeve 12 serves as a stop for the section of pipe to be connected to the branch by the coupling.

The ends of the initial tube are threaded in a well-known manner to receive tightening collars 13, shown in detail in Fig. 6. The function of these collars is to squeeze a packing ring against the outer wall of the piping inserted in the respective ends of the coupling; hence they are preferably in the form of a nut, so as to be readily operated by a wrench. The tightening collars 13 are threaded at one end on the inner surface, while at the other end they bear an inner annular flange. Between the annular flange and the threaded portion is an annular recess or groove, and in this groove fits the packing ring 14, of rubber or other suitable yielding material. The inner diameter of the packing ring 14 is normally the same as the inner diameter of the annular flange at the end of the tightening collar. This dimension is substantially the same as the outside diameter of the section of pipe to be inserted and hence the pipe can be slipped into place conveniently. Due to the fact that the packing ring is located in a groove, any tendency of the pipe, while being inserted, to carry the packing ring along with it is overcome. After the pipe is inserted in the coupling in this manner the tightening collar is screwed down, thus squeezing the packing ring against the outside wall of the pipe and making a secure connection. A similar collar and connecting means are employed for securing the pipe in the branch.

The particular material from which the couplings are made is not a part of my invention, as it is apparent that any suitable material capable of being worked in the manner set forth may be employed.

I claim:

1. A pipe coupling comprising a tubular member with a branch wrought from its wall and a strengthening and lengthening sleeve secured to and projecting from said wrought branch.

2. A pipe coupling comprising a tubular member with a branch wrought from its wall and a sleeve secured in said wrought branch and having an internal abutment shoulder.

3. A pipe coupling comprising a tubular member with a branch wrought from its wall and a sleeve having larger and smaller ends, said sleeve disposed with its smaller end within said wrought branch and with its larger end projecting from said wrought branch.

4. A pipe coupling comprising a tubular member with a wrought branch and a sleeve having larger and smaller ends forming inner and outer abutment shoulders, said sleeve disposed with its smaller end within the wrought branch and with its larger end projecting from said wrought branch and having external threading.

WILLIAM R. WILLETTS.

Witnesses:
INEZ E. KIMBALL,
WHITMAN W. BOWERS.